(12) United States Patent
Heitzmann

(10) Patent No.: US 11,560,186 B2
(45) Date of Patent: Jan. 24, 2023

(54) LOAD SENSING PIN BOX

(71) Applicant: MORryde International, Inc., Elkhart, IN (US)

(72) Inventor: David E. Heitzmann, Union, MI (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 769 days.

(21) Appl. No.: 16/372,560

(22) Filed: Apr. 2, 2019

(65) Prior Publication Data

US 2019/0300078 A1  Oct. 3, 2019

Related U.S. Application Data

(60) Provisional application No. 62/651,368, filed on Apr. 2, 2018.

(51) Int. Cl.
*G01L 1/00* (2006.01)
*B62D 53/08* (2006.01)
*G01L 1/22* (2006.01)

(52) U.S. Cl.
CPC ........ *B62D 53/0842* (2013.01); *G01L 1/2206* (2013.01)

(58) Field of Classification Search
CPC ........................... B62D 53/0842; G01L 1/2206
See application file for complete search history.

(56) References Cited

U.S. PATENT DOCUMENTS

2019/0225286 A1* 7/2019 Schutt ...................... G01L 1/04

FOREIGN PATENT DOCUMENTS

EP           1199547 A2 *   4/2002   ............ B60D 1/248

OTHER PUBLICATIONS

Office Action, Canadian Patent Application No. 3,038,663, dated Apr. 8, 2020.

* cited by examiner

*Primary Examiner* — Jamel E Williams
(74) *Attorney, Agent, or Firm* — Marshall, Gerstein & Borun LLP

(57) ABSTRACT

A pin box assembly having a column connected to a skid plate with an upper and lower surface. A kingpin is affixed to and extends from the skid plate. The skid plate is restrained from movement with respect to the column, and the column is for being connected to a towable RV. A strain gauge may be mounted to an upper surface of the skid plate. As an alternative to mounting the strain gauge to the skid plate, the strain gauge may be mounted to the column of the pin box. The strain gauges in the aforementioned locations measure strain as the weight of a towable RV is placed upon a fifth wheel hitch.

18 Claims, 11 Drawing Sheets

LOAD SENSING PIN BOX

CROSS REFERENCE TO RELATED APPLICATIONS

This application claims the benefit of U.S. Provisional Application 62/651,368 filed Apr. 2, 2018, the disclosures of which are hereby incorporated by reference.

BACKGROUND OF THE INVENTION

The weight distribution on a fifth wheel towable recreational vehicle (RV) is critical to handling and safety. However, understanding the load on a towable RV in real time use has been poorly understood. This lack of understanding has been particularly problematic to end users of towable RVs who have no way of knowing the actual load on their towable RV. Another problem of not knowing the load on a towable RV is that the towing vehicle may be subjected to unknown forces. The end users of towable RVs need to know the load characteristics so they can safely tow them.

Weight distribution in a towable RV can vary greatly. There are multiple reasons for significant variability in weight distribution. One reason is that options on a particular model of towable RV can be significantly different. The finishes, cabinetry, and other furniture can be different within the same model of towable RV. Additionally, the interior components or the user's cargo can be located in different places within the RV and that will affect weight distribution.

How an RV is used can also affect the weight distribution. Many towable RVs are toy haulers that have a cargo area near the rear of the vehicle. In such cases, the cargo may significantly alter the weight characteristics of the towable. As such, even if an end user of the towable RV knew the proper weight distribution before loading, it is unlikely that he will know it after loading unless some effort was taken to weigh the towable RV. Therefore, there is a need for monitoring the weight characteristics of towable RVs with very little effort on the part of the user.

SUMMARY OF THE INVENTION

The present invention is a pin box assembly having a column connected to a skid plate with an upper and lower side. The column is for being connected to a towable RV. The skid plate is restrained from movement with respect to the column. A kingpin is affixed to and extends from said skid plate. The connection of the skid plate to the column may be a rigid connection such as welding to the column or it may be through a shear spring. In the case of a shear spring assembly, the column has a top plate that is affixed to the column. The top plate is spaced from and opposite to the upper side of the skid plate. A restraining shaft is fixed with respect to the skid plate and spaced from the upper side of the skid plate. A channel is fixed to the top plate and surrounds the restraining shaft. The rubber shear spring has a rubber member bonded between an upper plate and a lower plate. The rubber member resists relative movement of the upper plate with respect to the lower plate. The upper plate is fixed with respect to the top plate on the column and the lower plate is fixed with respect to the skid plate.

In either a rigid connection of the skid plate to the column or a shear spring connection, a strain gauge may be mounted to an upper surface of the skid plate. As an alternative to the strain gauge being mounted to the skid plate, the stain gauge may be mounted to the column of the pin box. The strain gauges in the aforementioned locations measure strain as the weight of a towable RV is placed upon a fifth wheel hitch.

DETAILED DESCRIPTION OF INVENTION

Figure 1:
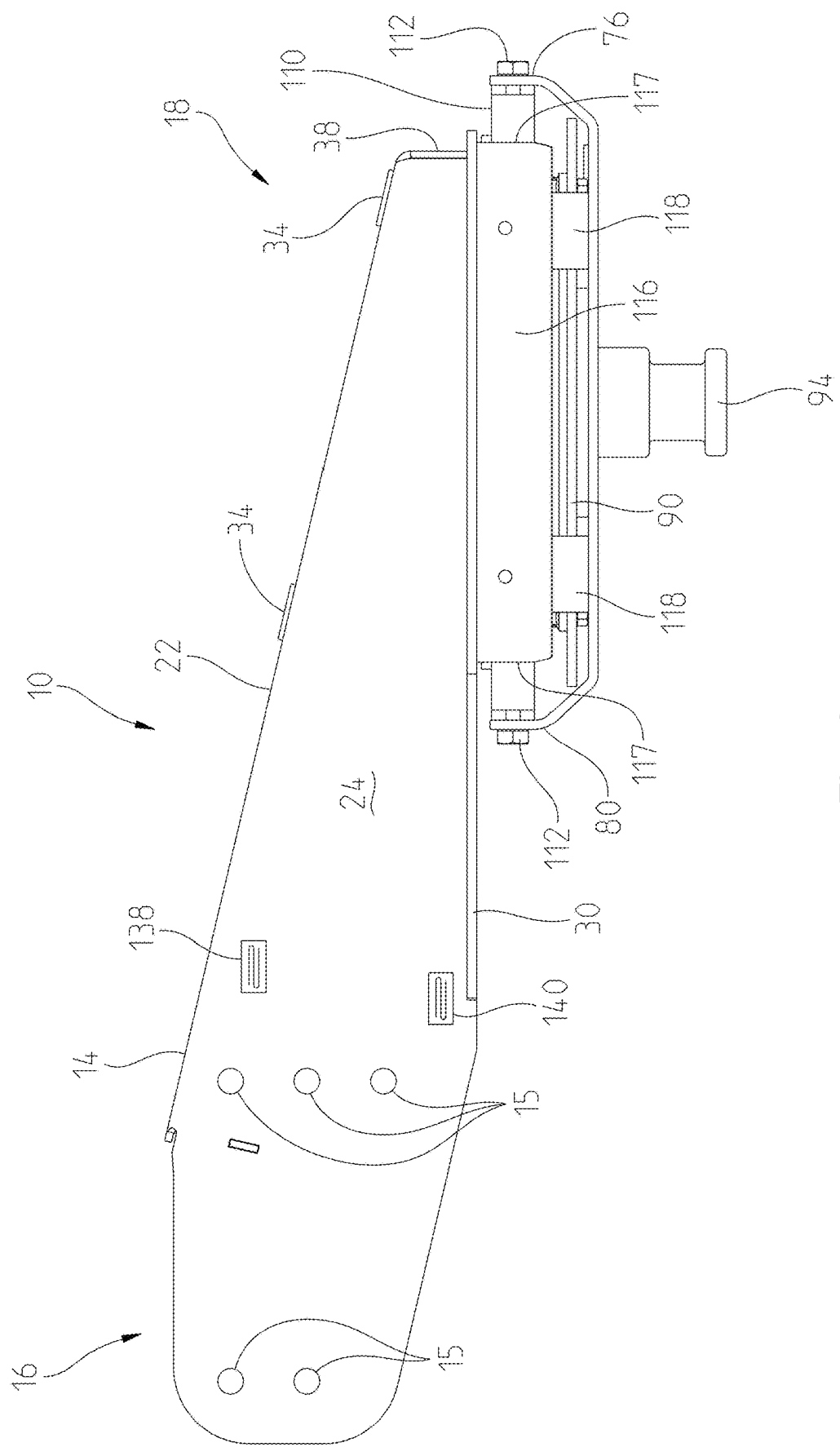
FIG. 1 is a side view of the pin box.
Figure 2:
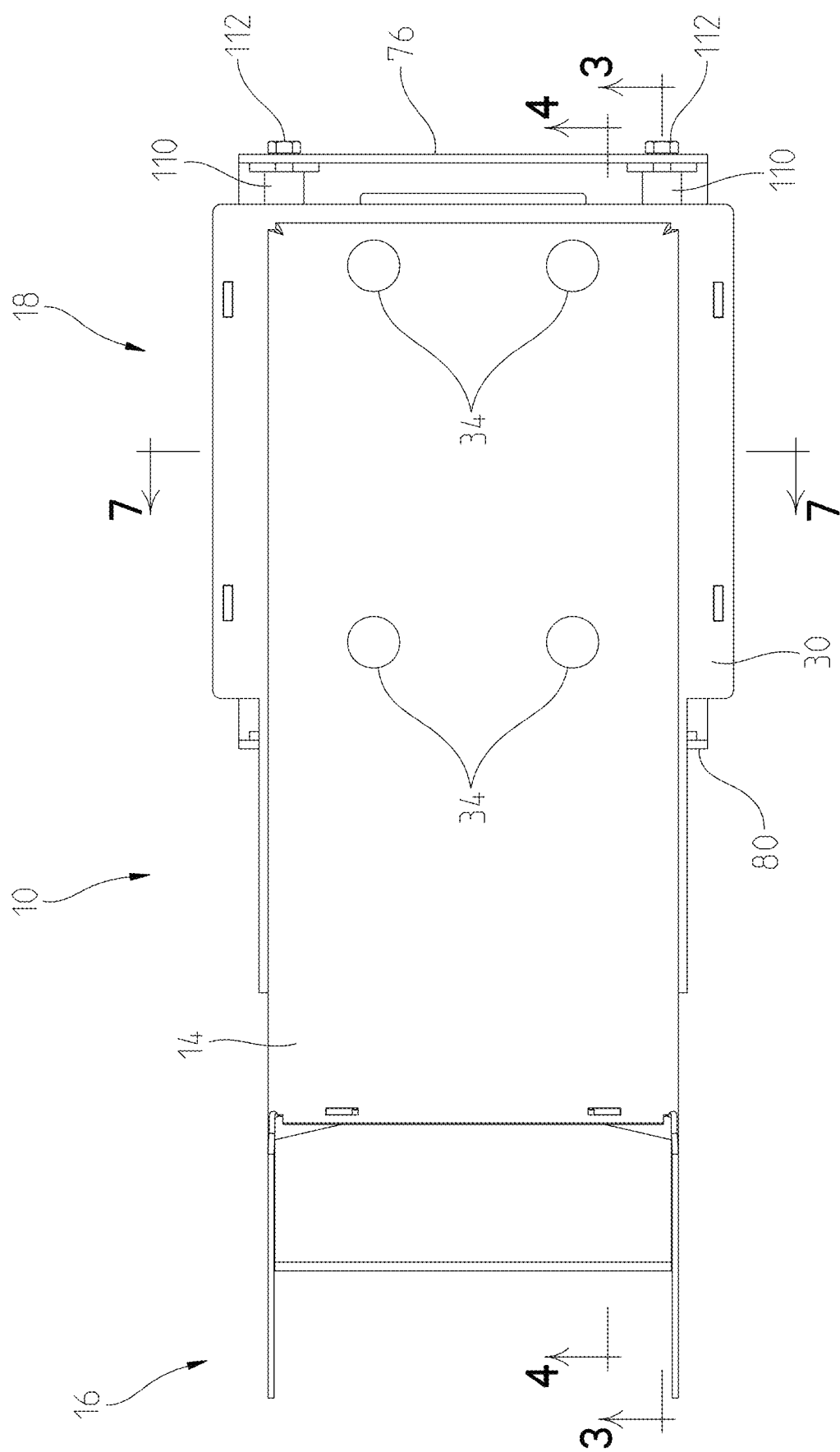
FIG. 2 is a top view of the pin box shown in FIG. 1.

FIG. 1 shows a side view of the load sensing pin box 10 of the present invention. The pin box 10 has a column 14 having a trailer end 16 and a towing end 18. The column 14 has a top wall 22 side walls 24, 26 and a bottom wall 28. The bottom wall bends into a top plate 30 that is located at the towing end 18 of the column 14. The trailer end 16 of the column 14 has holes 15 that are for receiving bolts that will attach the trailer end 16 to the trailer upon which the pin box 10 is affixed. The top wall 22 of the column 14 near the towing end 18 includes holes that are covered with access plugs 34. The access plugs 34 are removable to allow a socket on an extension to be extended into the column 14. The column 14 is hollow and the top wall 22, side walls 24, 26, and bottom wall 28 form an enclosed interior space that can be seen in FIG. 3.

Figure 4:
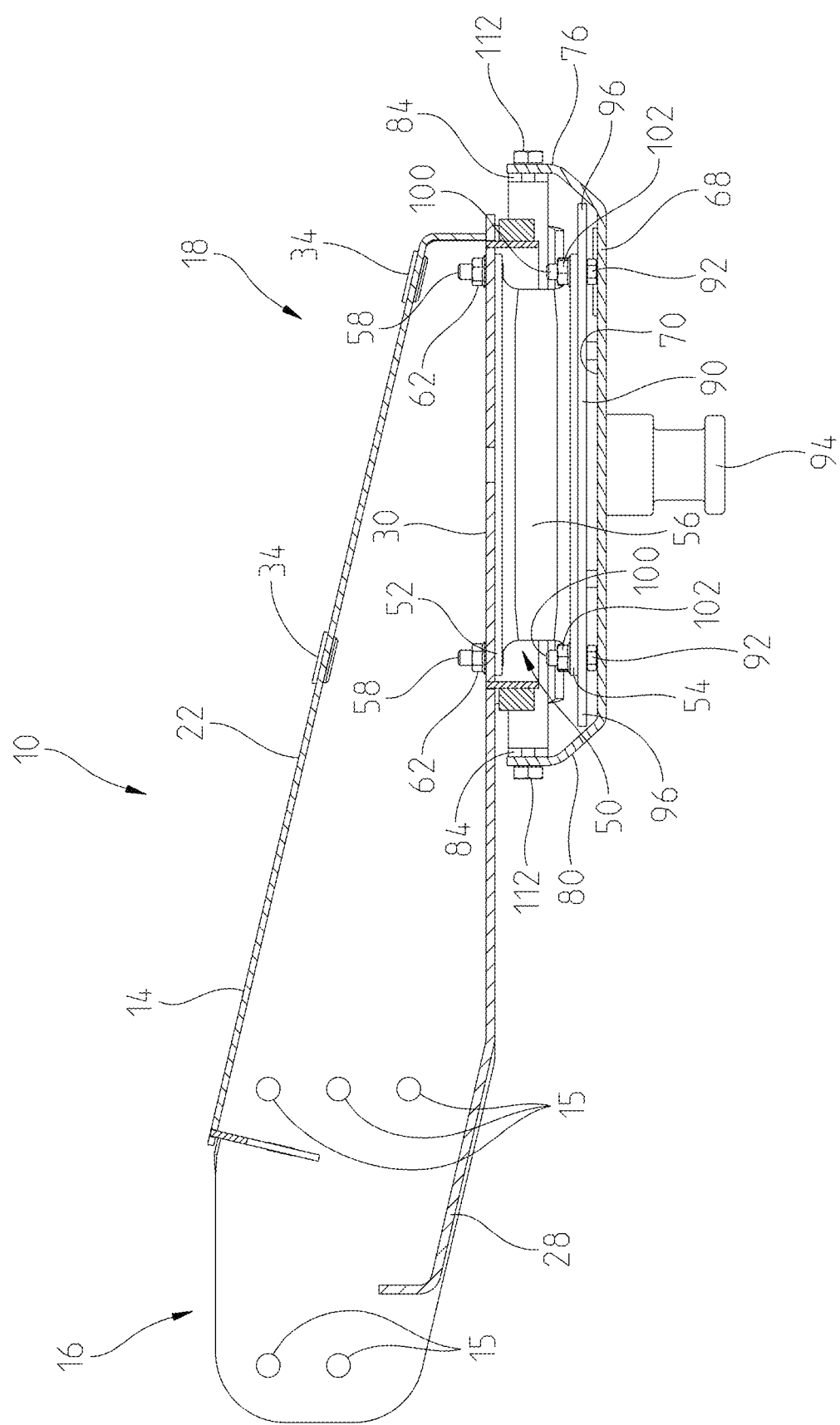
FIG. 4 is a sectional view of the pin box taken about the line 4-4 in FIG. 2.
Figure 6:
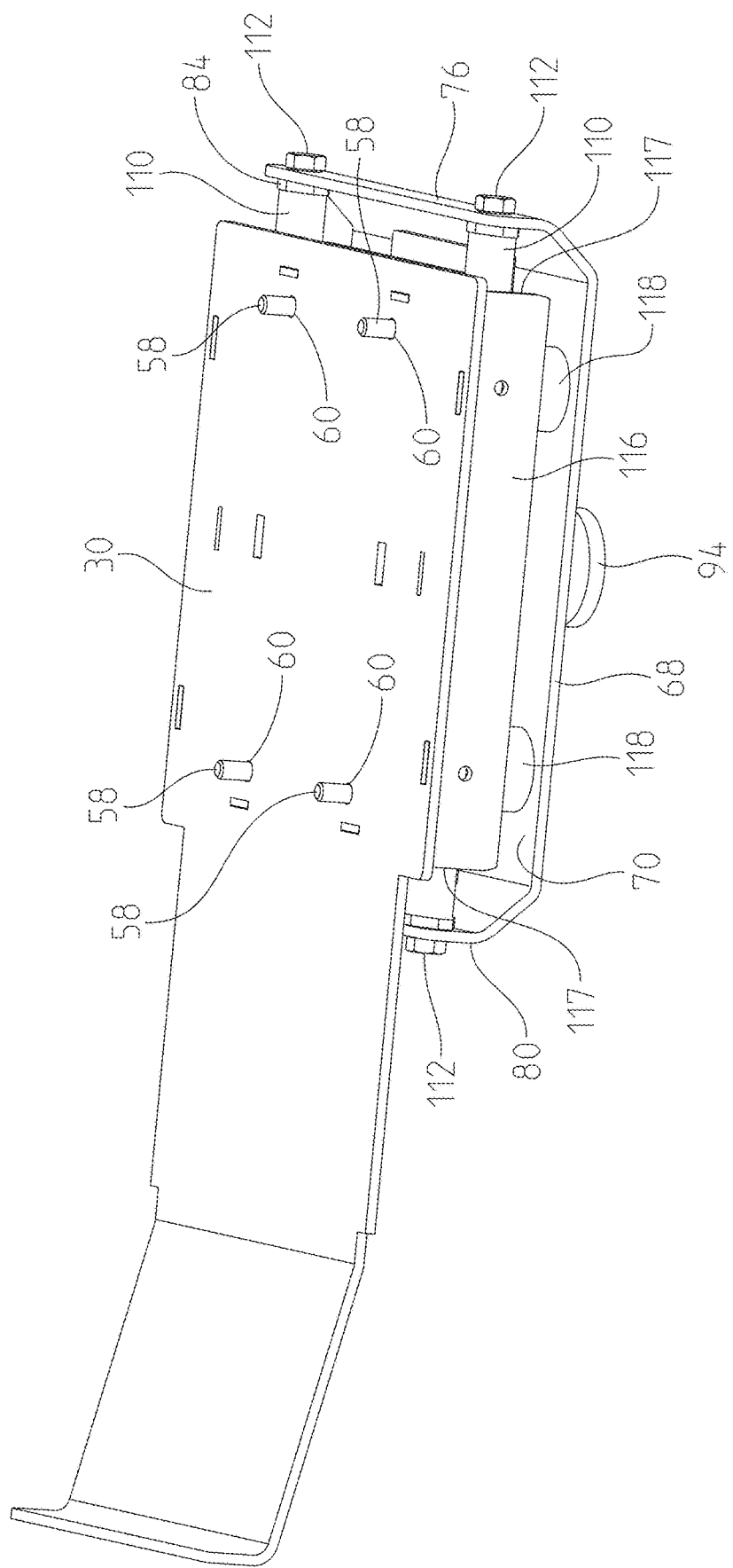
FIG. 6 is a perspective view of the pin box without the column attached.
Figure 7:
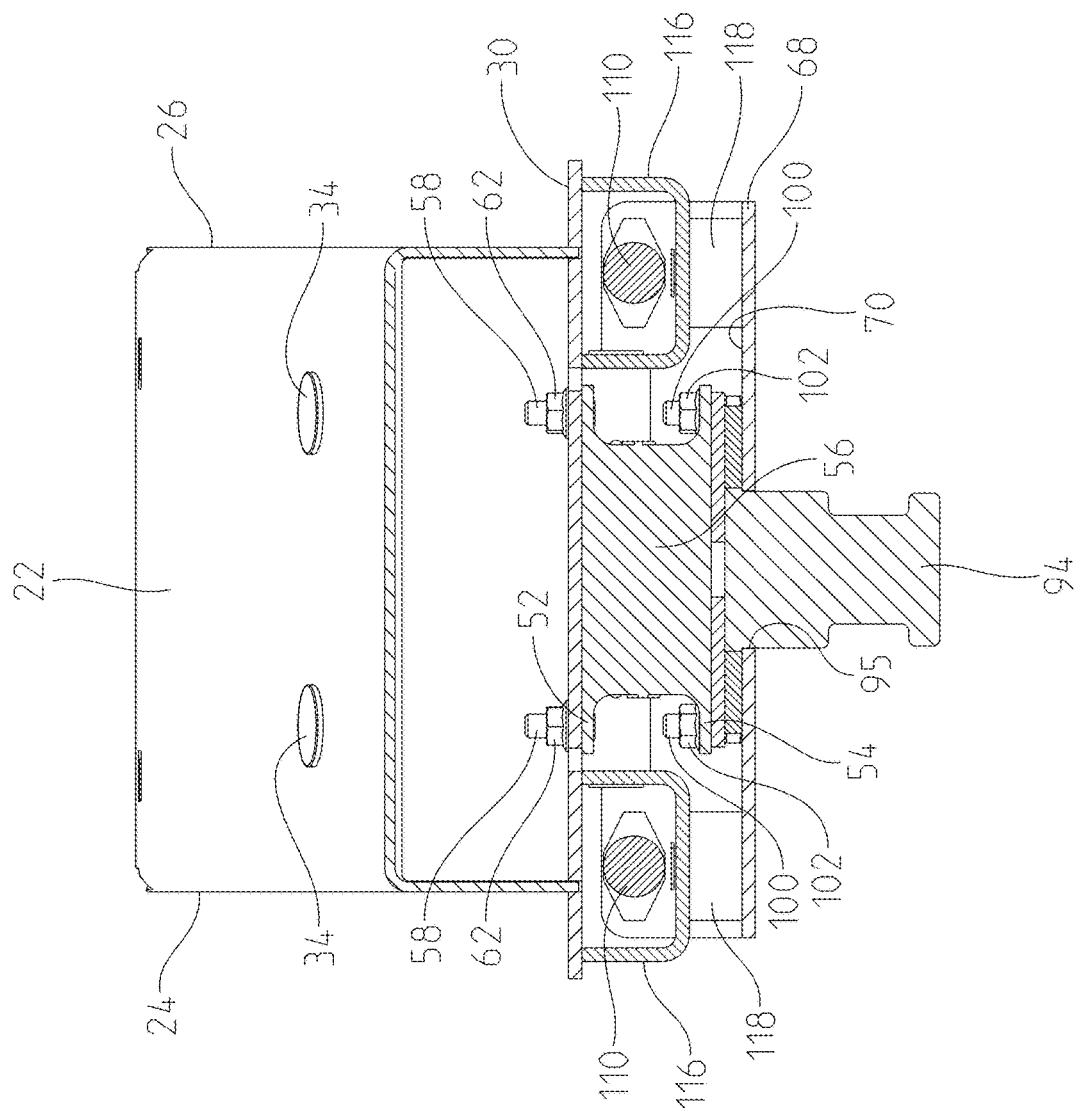
FIG. 7 is a sectional view of the pin box taken about line 7-7 in FIG. 2.
Figure 8:
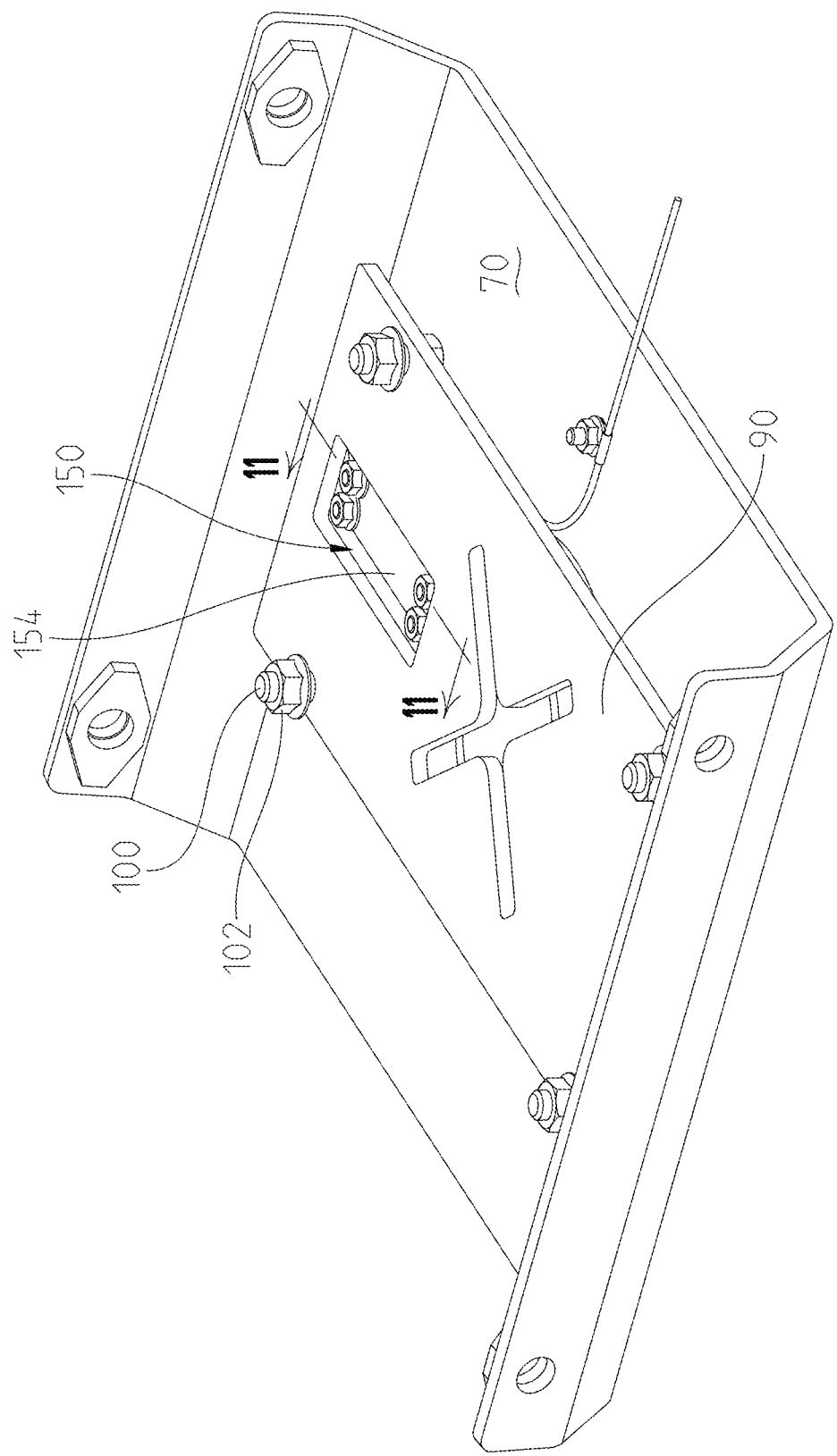
FIG. 8 is a perspective view of a strain gauge assembly that is bolted to the skid plate.
Figure 9:
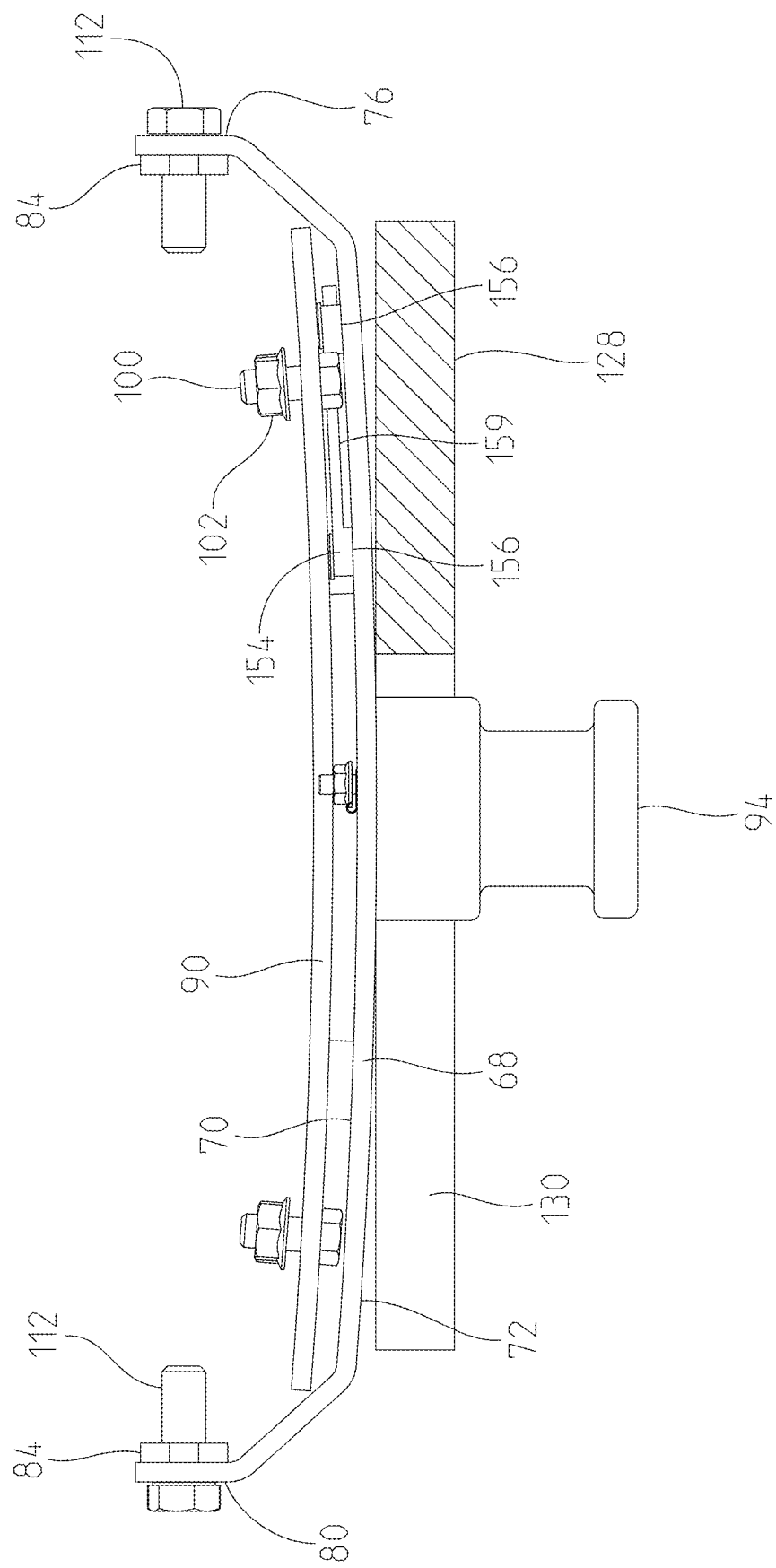
FIG. 9 is a sectional view taken through the skid plate showing the skid plate on a fifth wheel hitch and showing the strain gauge assembly shown in FIG. 8.
Figure 10:
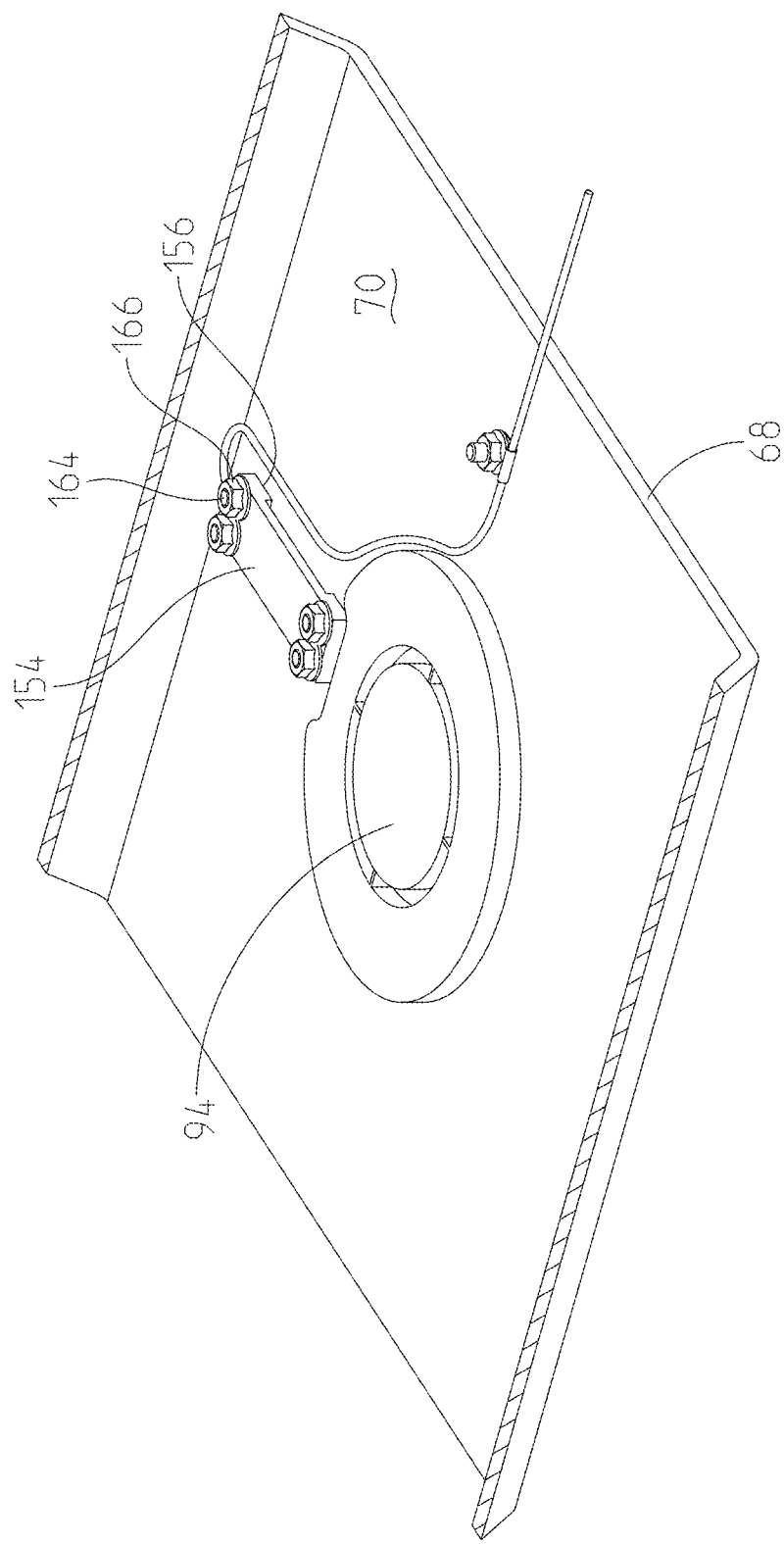
FIG. 10 is sectional view showing the upper surface of the skid plate and top of the kingpin with the strain gauge shown in FIGS. 8 and 9.

The top plate 30 is welded to the sidewalls 24, 26 and a nose 38 that is bent down from the top wall 22. The combination of these parts forms a very rigid box structure. FIG. 6 shows the top plate 30 with the side walls 24, 26 and top wall 22 removed. The top plate 30 has four holes 60. The top plate rests upon a rubber shear spring 50 as can be seen in FIG. 4. The shear spring 50 has a first plate 52 (being an upper plate) a second plate 54 (being a lower plate) and a rubber member 56 that is bonded to the first and second plates 52, 54. The rubber member 56 of the shear spring 50 resists movement of the first plate 52 relative to the second plate 54. The rubber member 56 is chosen of a particular durometer and density to provide desired properties of shear resistance, resiliency, and damping. The rubber member 56 as shown in FIG. 7 is a single member that joins the first and second plates 52, 54 and resists relative movement between plates 52, 54. It is contemplated that the rubber member could be multiple rubber members instead of the single rubber member 56.

Figure 5:
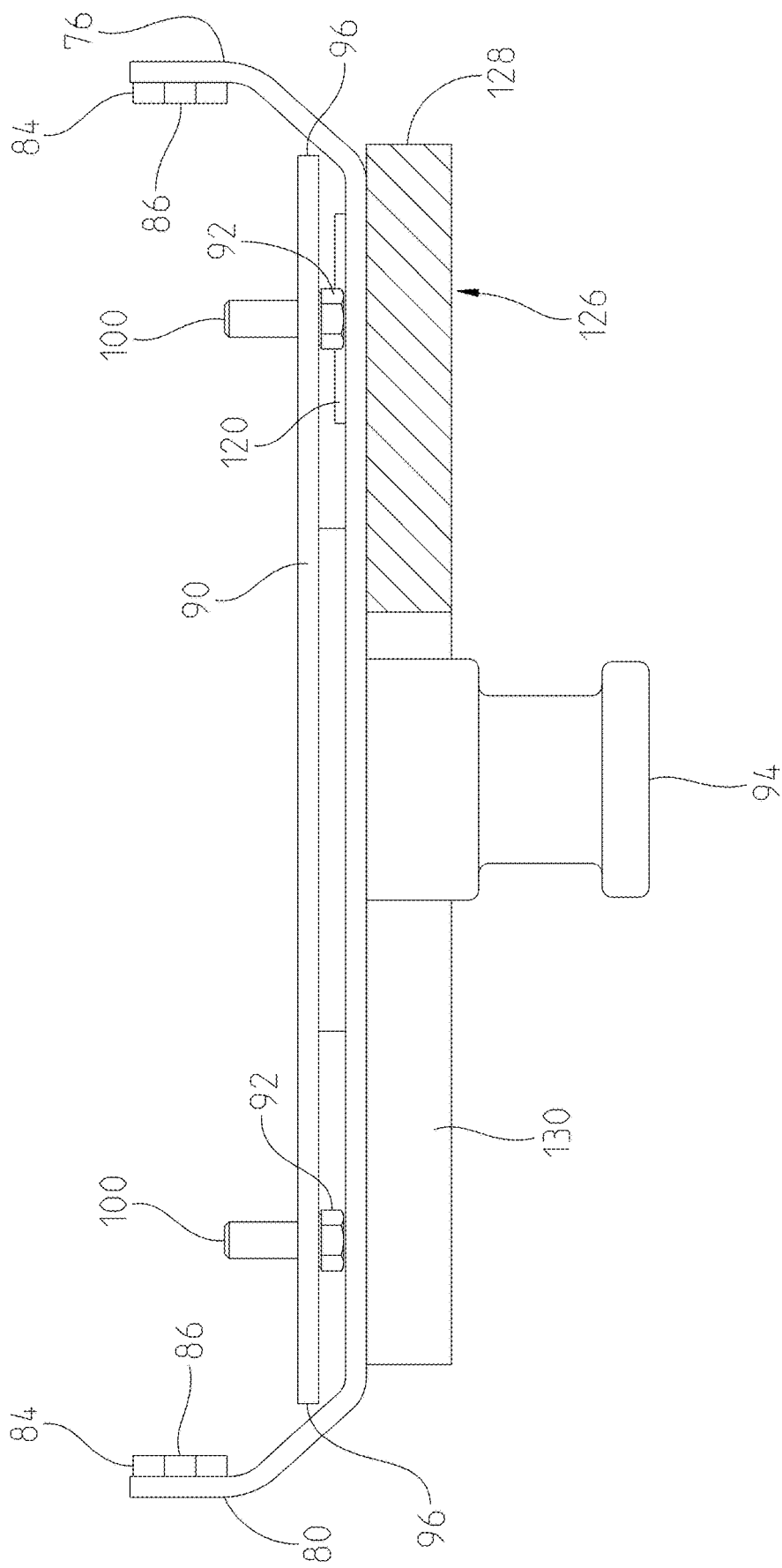
FIG. 5 is a sectional view of the pin box shown in FIGS. 1-4 without the column and rubber shear spring and with the skid plate supported on a fifth wheel hitch.

Portions of the shear spring 50 are restrained with respect to other parts within the pin box 10 to control the behavior of the pin box 10 during towing. The first plate 52 includes studs 58 extending upwardly. The studs 58 are received in the holes 60 in the top plate 30. Nuts 62 are tightened onto the studs 58 and the first plate 52 is fixed with respect to the top plate 30. Thus, the first plate 52 is fixed with respect to the column 14. Therefore, the first plate 52 is fixed with respect to the trailer that is attached to the column 14. On the opposite side of the shear spring 50 is skid plate 68. The skid plate 68 has an upper surface 70 and a lower surface 72. The skid plate 68 is bent upwardly to form a front end wall 76 and a rear end wall 80. Each end wall 76, 80 includes mounting bosses 84 that have holes 86. A spring plate 90 is spaced above the skid plate 68. The spring plate 90 is fixed to the skid plate 68. The attachment of the spring plate 90 is through spacers 92 that are welded to both the skid plate 68 and spring plate 90. Additionally, the spring plate 90 is welded at its ends 96 to the end walls 76, 80 of the skid plate 68. As can be seen in FIG. 5, the spacers 92 are heads of bolts 100 that extend through the spring plate 90. The bolts 100 extend through the second plate 54 of the shear spring 50 and nuts 102 are tightened onto the second plate 54. Thus, the second plate 54 of the shear spring 50 is fixed with respect to the skid plate 68, and the first plate 52 of the shear spring 50 is fixed with respect to the column 14 of the pin box 10. Therefore, the skid plate 68 resists translational movement with respect to the column 14 of the pin box 10. A kingpin 94 is welded to the spring plate 90. The kingpin 94 extends through an aperture 95 in the skid plate 68.

The skid plate 68 has restraining shafts 110 that are held in place between the front end wall 76 and rear end wall 80. This can be seen in FIGS. 1 and 3. Bolts 112 are driven through each of the holes 86 in the mounting bosses 84 and into each restraining shaft 110 to hold them in place. The underside of the top plate 30 includes a pair of channels 116 that are shown in FIG. 7. These channels 116 are shown as rectangular in cross section, but other cross sectional shapes would be suitable as well. Each channel 116 has ends 117 and a slide block 118 that is attached to the bottom of the channel 116. The slide block 118 is preferably a low friction material such as a high molecular weight plastic or similar material. The slide blocks 118 are held with screws 120 to the channels 116. The slide blocks 118 extend between the channels 116 and the upper surface 70 of the skid plate 68. As shown in FIG. 7, the slide blocks straddle the spring plate 90. During operation of the pin box 10, the slide blocks 118 bear the tongue weight of the trailer and position the channels 116 so they do not contact the restraining shafts 110. Although axial and lateral movement of the channels 116 with respect to the retention bars 110 is possible, the ends 117 of the channels restrain the shear spring 50 and top plate 30 from excessive movement with respect to the skid plate 68. In longitudinal movement, the ends 117 of the channels 116 will contact either the front end wall 76 or rear end wall 80 of the skid plate 68 after moving a predetermined distance. The predetermined distance that results in the ends 117 of the channels 116 contacting the end walls 76, 80 is chosen to prevent the first and second plates 52, 54 from delaminating from the rubber member 56.

The attachment of the spring plate 90 with respect to the skid plate 68 leaves a space between the two parts. A strain gauge 120 is affixed to the upper surface 70 of the skid plate 68. During use, the skid plate 68 receives the tongue weight of the trailer connected to the pin box 10. The skid plate 68 rests on a fifth wheel hitch 126 that is shown in FIG. 5. The fifth wheel hitch 126 has a hitch plate 128 and a jaw beneath the plate 128 (not shown) that holds the kingpin 94. The kingpin rests within a keyhole slot 130 within the hitch plate 128. The hitch plate 128 supports the tongue weight through its contact with the skid plate 68. The force of the tongue weight bearing on the skid plate 68 creates a small amount of strain in the skid plate 68. The strain gauge 120 as it is located in FIG. 7 measures the tension in the upper surface 70 of the skid plate 68. Although the strain gauge 120 as shown in FIG. 7 is used beneath a rubber shear spring 50, the use of the shear spring 50 is not a necessity, and use of the strain gauge 120 as shown in FIG. 7 is contemplated without the shear spring.

Figure 11:
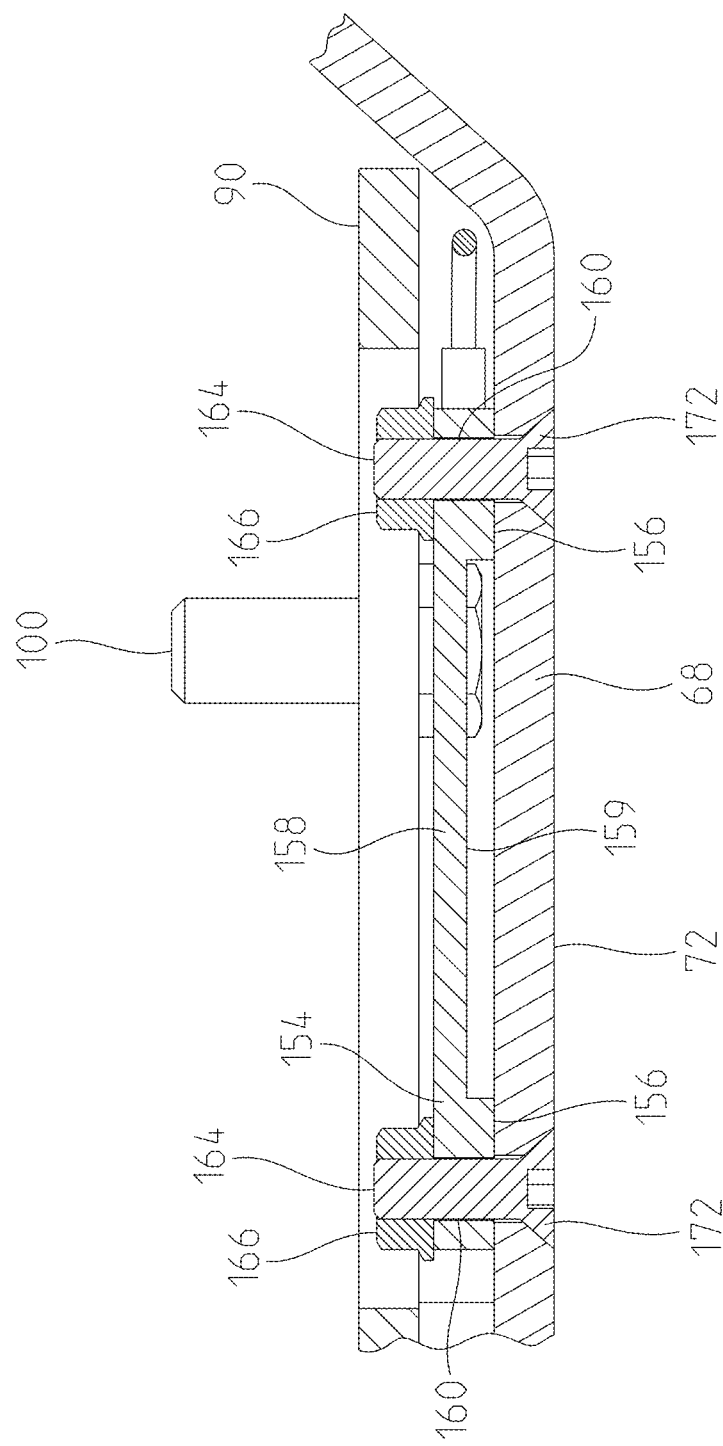
FIG. 11 is a sectional view taken about line 11-11 in FIG. 8.

The strain gauge 120 shown in FIG. 5 is directly applied to the upper surface 70 of the skid plate 68. However, it is also possible to use a strain gauge assembly 150. The strain gauge assembly 150 has a metal body 154 with raised pads 156 that are on an underside of the strain gauge assembly 150 (strain gauge assembly 150 and strain gauge will be used interchangeably hereinafter). The body 154 has a thinned section 158 that contains a strain gauge within the thinned section 158 that is located between the raised pads 156. The thinned section 158 has a lower surface 159 that is spaced from the upper surface 70 of the skid plate 68 when it rests upon the skid plate 68. Holes 160 near the corners of the body 154 receive bolts 164 that extend through the holes 160 and receive nuts 166 that clamp the strain gauge assembly 150 to the upper surface 70 of the skid plate 68. The bolts 164 extend through the skid plate 68 and have countersunk heads 172 that are below or aligned with the lower surface 72 of the skid plate 68. The bolts 164 clamp the body 154 of the strain gauge assembly 150 to the skid plate 68. When weight is placed upon the pin box 10 it presses downwardly on the skid plate 68. The skid plate 68 has a slight bow that is convex on its lower surface 72 where it contacts the fifth wheel hitch plate 128. FIG. 11 shows an exaggerated bow as the skid plate 68 contacts the hitch plate 128. The weight placed on the skid plate 68 tends to flatten the bow and stretch the upper surface 70 of the skid plate 68. This puts tension in the strain gauge body 154 and the strain gauge that is contained within the thinned section 158. The strain gauge assembly 150 measures strain in tension that is proportional to the weight placed upon the skid plate 68. The thinned section 158 of the body 154 concentrates the strain to be predictably most pronounced within the thinned section 158. The location of the lower surface of the thinned section 158 ensures that irregularities in the upper surface 70 of the skid plate do not improperly influence strain and locate the strain gauge located in the thinned section 158 further from the neutral axis of the skid plate.

Figure 3:
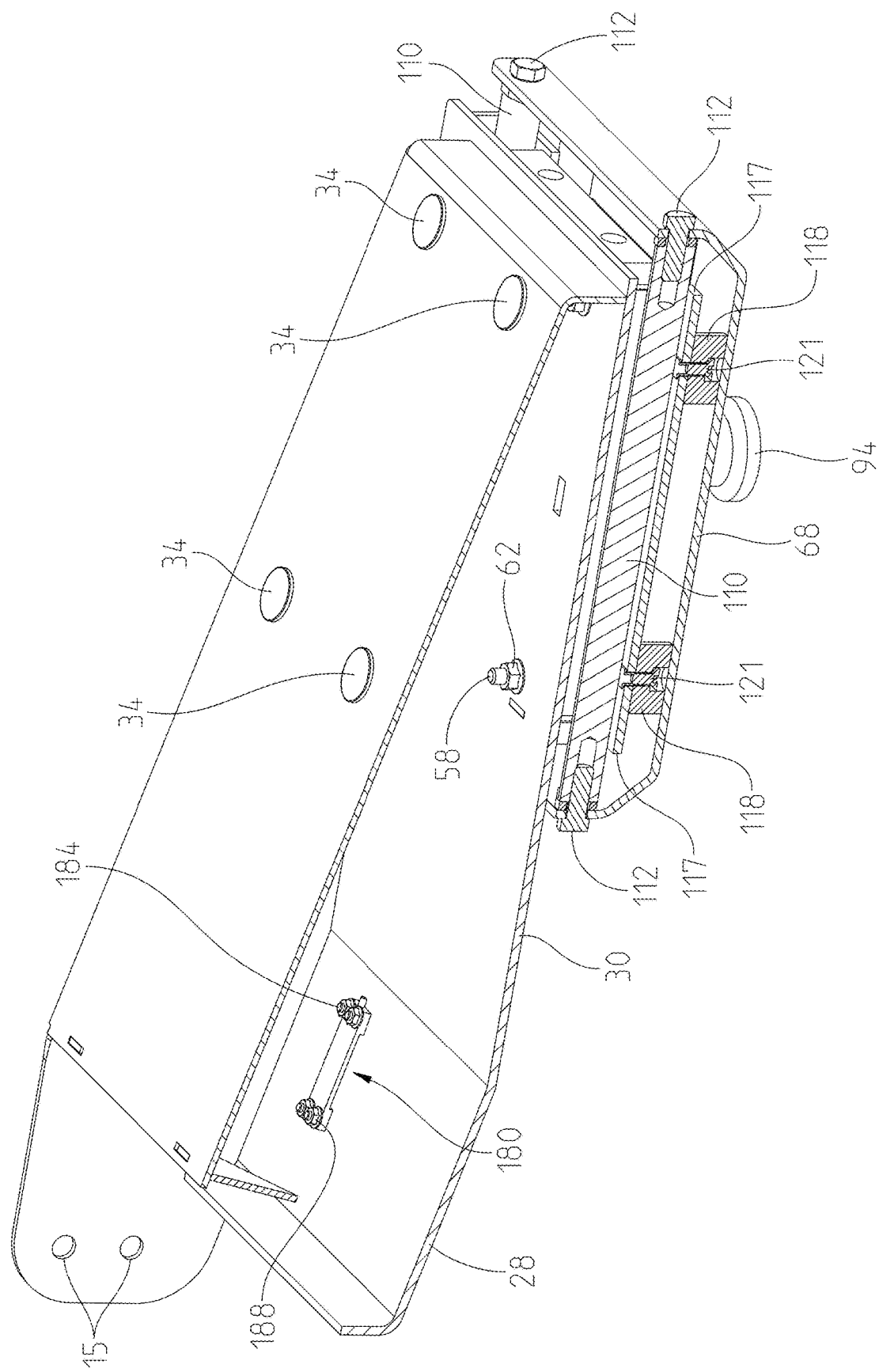
FIG. 3 is a perspective sectional view of the pin box taken about line 3-3 in FIG. 2.

It is possible to use a strain gauge 138, 140, 180 that is located on the column 14 to determine load on the pin box 10. It is contemplated that only one of the strain gauges 120, 138, 140, 150, 180 will be needed, but the separate locations in the drawings are shown. In other words, the strain gauge 120, 138, 140, 150, 180 can be used to determine tongue weight. When using a strain gauge 138, 140, 180 on the column, an ideal placement is near the trailer end 16. As can be seen in FIG. 1, strain gauge 138 will measure compressive strain and strain gauge 140 will measure tensile strain. Both strain gauges 138, 140 are located so they are spaced from the neutral axis of the column. The location of the strain gauges 138, 140 is also relatively far from the towing end 18 which is cantilevered with respect to the trailer end 16. This will measure the strain where the bending moment is the highest. Strain gauge 180 may be mounted within the column on bottom wall 28. Bolts 184 are driven through the bottom wall 28 as shown in FIG. 3 and nuts 188 clamp the strain gauge assembly 150 to the bottom wall 28.

In using the pin box 10 of the present invention, an initial strain reading will be taken at a strain gauge 120, 138, 140 when there is no load on the skid plate 68. After this initial zero reading is taken, a second reading is taken with a known tongue weight. The second reading is recorded and is used to calibrate the strain gauge. Once the strain gauge is calibrated, the load on the skid plate 68 that corresponds to tongue weight can be calculated through measuring the strain at the locations of any one of the strain gauges 120, 138, 140. If redundancy is desired measurements can be taken and compared between strain gauges 120, 138, or 140.

The present invention is not limited to the details above but may be modified within the scope of the following claims.

What is claimed is:

1. A pin box assembly comprising:
   a skid plate having an upper side, and a lower side;
   a kingpin affixed to and extending from said skid plate;
   a top plate affixed to a column, said top plate being spaced from and opposite to said upper side of said skid plate;
   a restraining shaft fixed with respect to said skid plate and spaced from said upper surface of said skid plate;
   a channel being fixed to said top plate and surrounding said restraining shaft;
   a rubber shear spring having a rubber member bonded between an upper plate and a lower plate, said rubber member resisting relative movement of said upper plate with respect to said lower plate;
   said upper plate being fixed with respect to said top plate and said lower plate being fixed with respect to said skid plate;
   a strain gauge being affixed to said upper surface of said skid plate.

2. The pin box assembly of claim 1, wherein said skid plate is convex on said lower side.

3. The pin box assembly of claim 2, wherein said channel includes a slide block extending toward said upper surface of said skid plate said slide block for sliding along said upper surface of said skid plate when said top plate moves with respect to said skid plate.

4. The pin box assembly of claim 2, wherein said strain gauge is contained with a strain gauge assembly, said strain gauge assembly including holes for receiving fasteners to affix said strain gauge assembly to said skid plate.

5. The pin box assembly of claim 4, wherein said strain gauge assembly is bolted to said skid plate.

6. The pin box assembly of claim 5, wherein said strain gauge includes a thinned section, said thinned section including a lower surface that is located between raised pads, said fasteners extend through holes in said raised pads and said lower surface of said thinned section being spaced from said upper surface of said skid plate when said strain gauge assembly is bolted to said skid plate.

7. The pin box assembly of claim 4, wherein the strain gauge assembly has a body including raised pads on an underside of said strain gauge assembly.

8. A pin box assembly of comprising:
   a column;
   a skin plate affixed to said column;
   a kingpin extending downwardly from said skid plate; and
   a strain gauge affixed to said skid plate;
   wherein said column includes a top plate affixed to said column, said top plate being spaced from and opposite to said skid plate, a restraining shaft fixed with respect to said skid plate and being spaced from an upper surface of said skid plate, a channel being fixed to said top plate and surrounding said restraining shaft, a rubber shear spring having a rubber member bonded between an upper plate and a lower plate, said rubber member resisting relative movement of said upper plate with respect to said lower plate, said upper plate being fixed with respect to said top plate and said lower plate being fixed with respect to said skid plate.

9. The pin box assembly of claim 8, said skid plate being convex on a lower side opposite said column.

10. The pin box assembly of claim 9, wherein said channel includes a slide block extending toward said upper surface of said skid plate said slide block for sliding along said upper surface of said skid plate when said top plate moves with respect to said skid plate.

11. The pin box assembly of claim 10, wherein said strain gauge is contained with a strain gauge assembly, said strain gauge assembly including holes for receiving fasteners to affix said strain gauge assembly to said skid plate.

12. The pin box assembly of claim 11, wherein the strain gauge assembly has a body including raised pads on an underside of said strain gauge assembly.

13. A pin box assembly comprising:
    a column;
    a skid plate affixed to said column;
    a kingpin extending downwardly from said skid plate; and
    a strain gauge affixed to said column.

14. A pin box assembly as claimed in claim 13, wherein said column includes a top plate affixed to said column, said top plate being spaced from and opposite to said skid plate, a restraining shaft fixed with respect to said skid plate and being spaced from an upper surface of said skid plate, a channel being fixed to said top plate and surrounding said restraining shaft, a rubber shear spring having a rubber member bonded between an upper plate and a lower plate, said rubber member resisting relative movement of said upper plate with respect to said lower plate, said upper plate being fixed with respect to said top plate and said lower plate being fixed with respect to said skid plate.

15. The pin box assembly of claim 14, wherein said channel includes a slide block extending toward said upper surface of said skid plate said slide block for sliding along said upper surface of said skid plate when said top plate moves with respect to said skid plate.

16. The pin box assembly of claim 15, wherein said strain gauge is contained with a strain gauge assembly having, said strain gauge assembly including holes for receiving fasteners to affix said strain gauge assembly to said column.

17. The pin box assembly as claimed in claim 13, wherein said column includes a top wall, side walls joined to said top wall and a bottom wall joined to said side walls, said bottom wall opposite said top wall, said walls defining an enclosed interior space, said strain gauge being affixed to one of said walls within said enclosed interior space.

18. The pin box assembly as claimed in claim 17, wherein said column includes a top plate affixed to said column, said top plate being spaced from and opposite to said skid plate, a restraining shaft fixed with respect to said skid plate and being spaced from an upper surface of said skid plate, a channel being fixed to said top plate and surrounding said restraining shaft, a rubber shear spring having a rubber member bonded between an upper plate and a lower plate, said rubber member resisting relative movement of said upper plate with respect to said lower plate, said upper plate being fixed with respect to said top plate and said lower plate being fixed with respect to said skid plate.

* * * * *